(12) United States Patent
Shin et al.

(10) Patent No.: US 12,160,666 B2
(45) Date of Patent: Dec. 3, 2024

(54) ELECTRONIC DEVICE INCLUDING CAMERA WITH BLUR REDUCTION

(71) Applicant: SAMSUNG ELECTRONICS CO., LTD., Suwon-si (KR)

(72) Inventors: Junseok Shin, Suwon-si (KR); Dongyoul Park, Suwon-si (KR); Sungmin Kim, Suwon-si (KR); Kioh Jung, Suwon-si (KR); Yeonhak Kim, Suwon-si (KR); Dasom Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 153 days.

(21) Appl. No.: 17/740,948

(22) Filed: May 10, 2022

(65) Prior Publication Data
US 2022/0360713 A1   Nov. 10, 2022

Related U.S. Application Data

(63) Continuation of application No. PCT/KR2022/006624, filed on May 10, 2022.

(30) Foreign Application Priority Data

May 10, 2021   (KR) .......................... 10-2021-0060234

(51) Int. Cl.
*H04N 23/68* (2023.01)

(52) U.S. Cl.
CPC ....... *H04N 23/687* (2023.01); *H04N 23/6812* (2023.01)

(58) Field of Classification Search
CPC ............. H04N 23/687; H04N 23/6812; H04N 23/685; H04N 23/682; G02B 27/646
See application file for complete search history.

(56) References Cited

U.S. PATENT DOCUMENTS 5,852,749 A   12/1998   Konno et al.
7,929,046 B2   4/2011   Okamura
(Continued)

FOREIGN PATENT DOCUMENTS

JP   9-80549 A   3/1997
JP   2000-75336 A   3/2000
(Continued)

OTHER PUBLICATIONS

Communication dated Aug. 22, 2022, issued by the International Searching Authority in counterpart International Application No. PCT/KR2022/006624 (PCT/ISA/220, 210, 237).
(Continued)

*Primary Examiner* — Nicholas G Giles
(74) *Attorney, Agent, or Firm* — Sughrue Mion, PLLC

(57) ABSTRACT

An electronic device includes a camera module including an optical image stabilization device, a memory, and a processor, and the optical image stabilization device includes a first direction driver, a first driver circuit that controls the first direction driver, a second direction driver, and a second driver circuit that controls the second direction driver, and the first direction driver monitors a movement amount of the second direction driver from a control signal transmitted from the processor, determines a first correction amount corresponding to the movement amount, and controls the first direction driver based on the first correction amount. Additional various embodiments identified through the specification are possible.

20 Claims, 11 Drawing Sheets

(56) References Cited

U.S. PATENT DOCUMENTS

| | | | |
|---|---|---|---|
| 8,654,244 | B2 | 2/2014 | Okamura |
| 9,560,247 | B2 | 1/2017 | Topliss et al. |
| 10,469,752 | B2 | 11/2019 | Maede et al. |
| 10,613,342 | B2 | 4/2020 | Kasamatsu |
| 11,039,071 | B2 | 6/2021 | Min |
| 2015/0350507 | A1 | 12/2015 | Topliss et al. |
| 2016/0327806 | A1 | 11/2016 | Kasamatsu |
| 2018/0343393 | A1* | 11/2018 | Maede ............. G03B 5/04 |
| 2020/0120283 | A1* | 4/2020 | Min ............. H04N 23/55 |

FOREIGN PATENT DOCUMENTS

| | | | |
|---|---|---|---|
| JP | 2003-75880 | A | 3/2003 |
| JP | 2007-243934 | A | 9/2007 |
| JP | 2008-191282 | A | 8/2008 |
| JP | 2018-124582 | A | 8/2018 |
| KR | 10-2006-0084003 | A | 7/2006 |
| KR | 10-2020-0041545 | A | 4/2020 |
| KR | 10-2020-0143971 | A | 12/2020 |

OTHER PUBLICATIONS

Extended European Search Report dated Jul. 24, 2024, issued by the European Patent Office in European Application No. 22807770.7.

\* cited by examiner

ELECTRONIC DEVICE INCLUDING CAMERA WITH BLUR REDUCTION

CROSS REFERENCE TO RELATED APPLICATION

This application is a bypass continuation of International Application PCT/KR2022/006624 filed May 10, 2022, which claims priority benefit of KR 10-2021-0060234 filed in the Korean Intellectual Property Office (KIPO) on May 10, 2021, the contents of the above are incorporated by reference herein.

TECHNICAL FIELD

Various embodiments of the disclosure relate to an electronic device including a camera and a shake correction method.

BACKGROUND ART

An electronic device such as a smartphone, a tablet PC, or the like may include a camera module (or a camera). The camera module may obtain image data through an image sensor. Image data acquired through the camera module may be stored in a memory inside the electronic device or may be output as a preview image through a display.

The camera module of the electronic device may include a shake stabilization device to compensate for shake (e.g., a user's hand shake) that occurs during photographing. The camera module may include, for example, an optical image stabilization (hereinafter, OIS) device.

The shake stabilization device may move a lens or an image sensor in a direction compensating for shake of the electronic device when shake of the electronic device occurs while the camera module acquires an image.

DISCLOSURE

Technical Problem

The electronic device may include a shake stabilization device. The shake stabilization device may compensate for the shake by moving a lens unit in a first axis (e.g., an X-axis) or a second axis (e.g., a Y-axis).

Since the electronic device controls the amount of change (or movement amount) for individual axes (the X-axis, the Y-axis), respectively, the electronic device may not correct an error component (an X-talk) for the amount of change in the Y-axis caused by driving the X-axis or the amount of change in the X-axis caused by driving the Y-axis.

When the high magnification zoom is used, the amount of blur of the image may be enlarged in proportion to the magnification according to the digital magnification. In this case, the crosstalk (X-talk) error component generated when the other axis is driven may be enlarged due to screen shake, and image quality may be deteriorated.

Various embodiments may provide an electronic device for monitoring and compensating for driving information of the other axis.

Technical Solution

According to an embodiment disclosed in the disclosure, an electronic device includes a camera module including an optical image stabilization device, a memory, and a processor, and the optical image stabilization device includes a first direction driver, a first driver circuit that controls the first direction driver, a second direction driver, and a second driver circuit that controls the second direction driver, and the first direction driver monitors a movement amount of the second direction driver from a control signal transmitted from the processor, determines a first correction amount corresponding to the movement amount, and moves the first direction driver based on the first correction amount.

Advantageous Effects

According to embodiments disclosed in this document, an electronic device may monitor driving information of the other axis to reduce the influence of crosstalk (X-talk) generated by the other axis. Through this, the amount of blur in the high magnification zoom may be reduced.

With regard to description of drawings, the same or similar components will be marked by the same or similar reference signs.

DETAILED DESCRIPTION

Various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. With regard to the description of drawings, similar components may be marked by similar reference marks/numerals.

Figure 1:
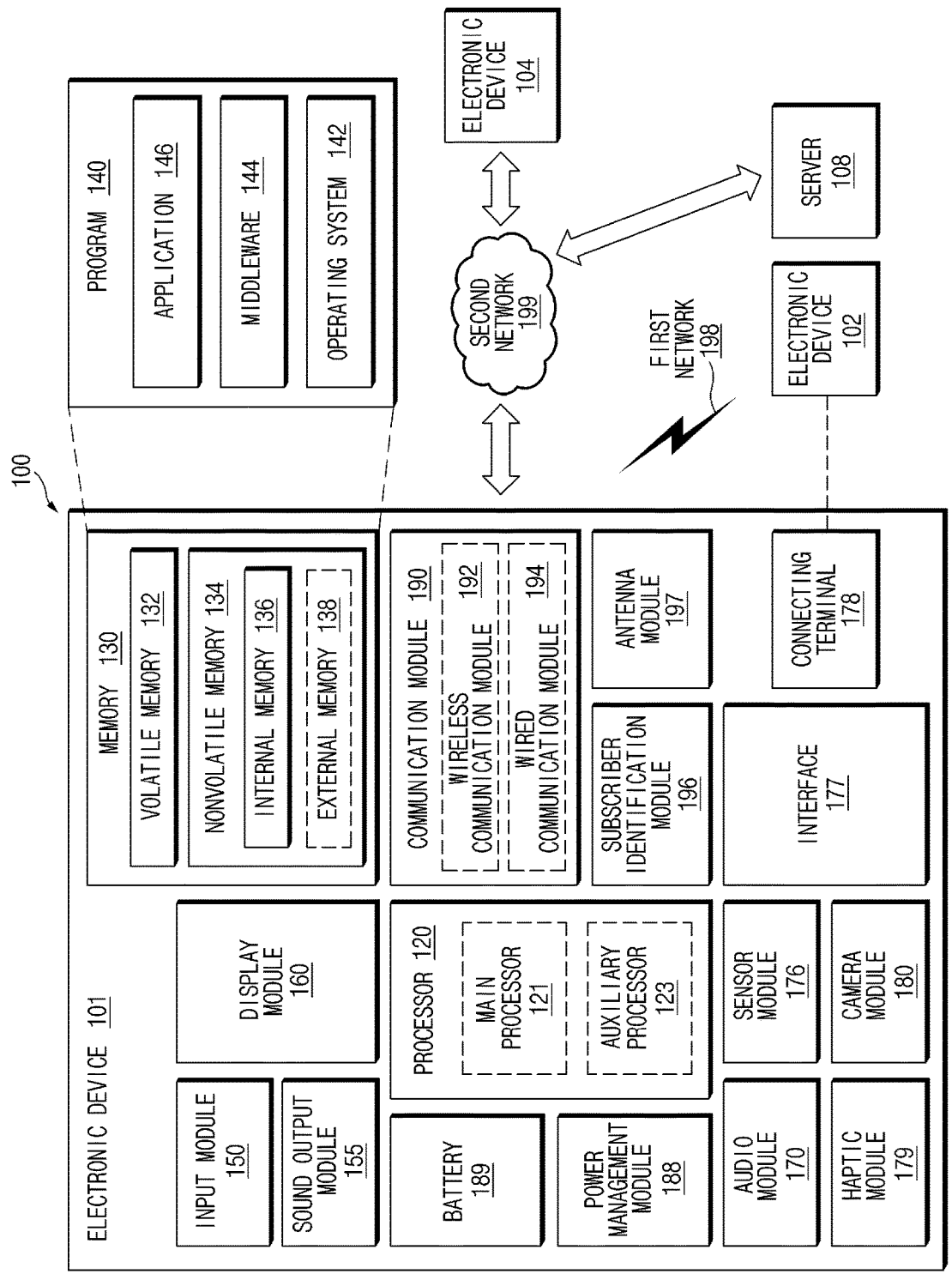
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
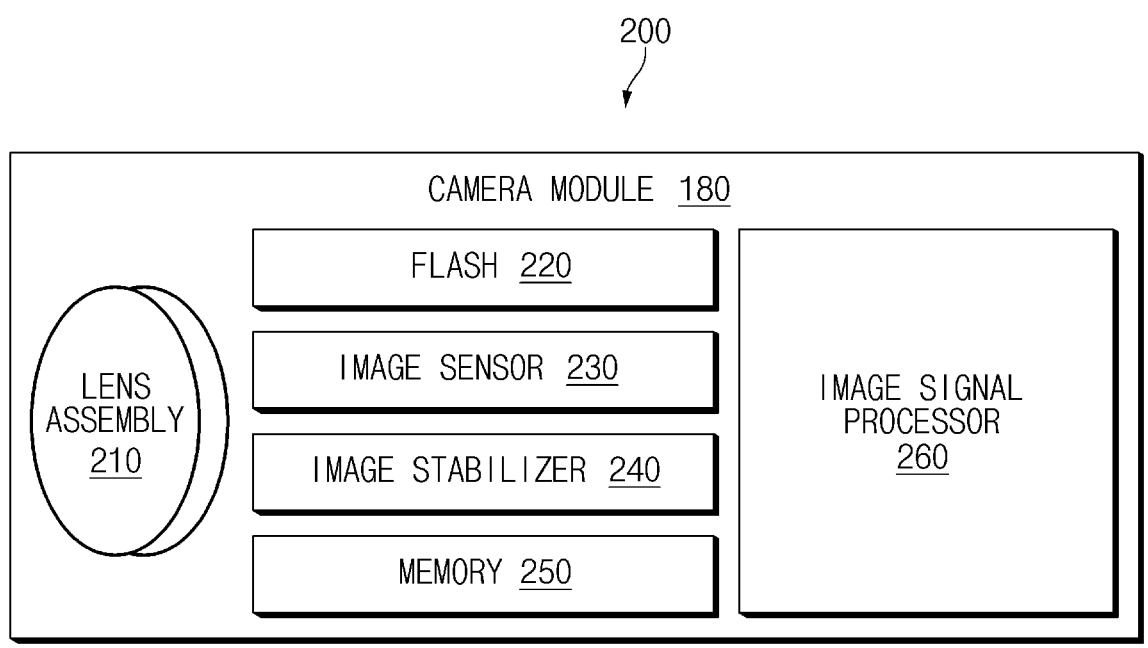
FIG. 2 is a block diagram illustrating a camera module, according to various embodiments.

FIG. 2 is a block diagram 200 illustrating the camera module 180 according to various embodiments.

Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

Figure 3:
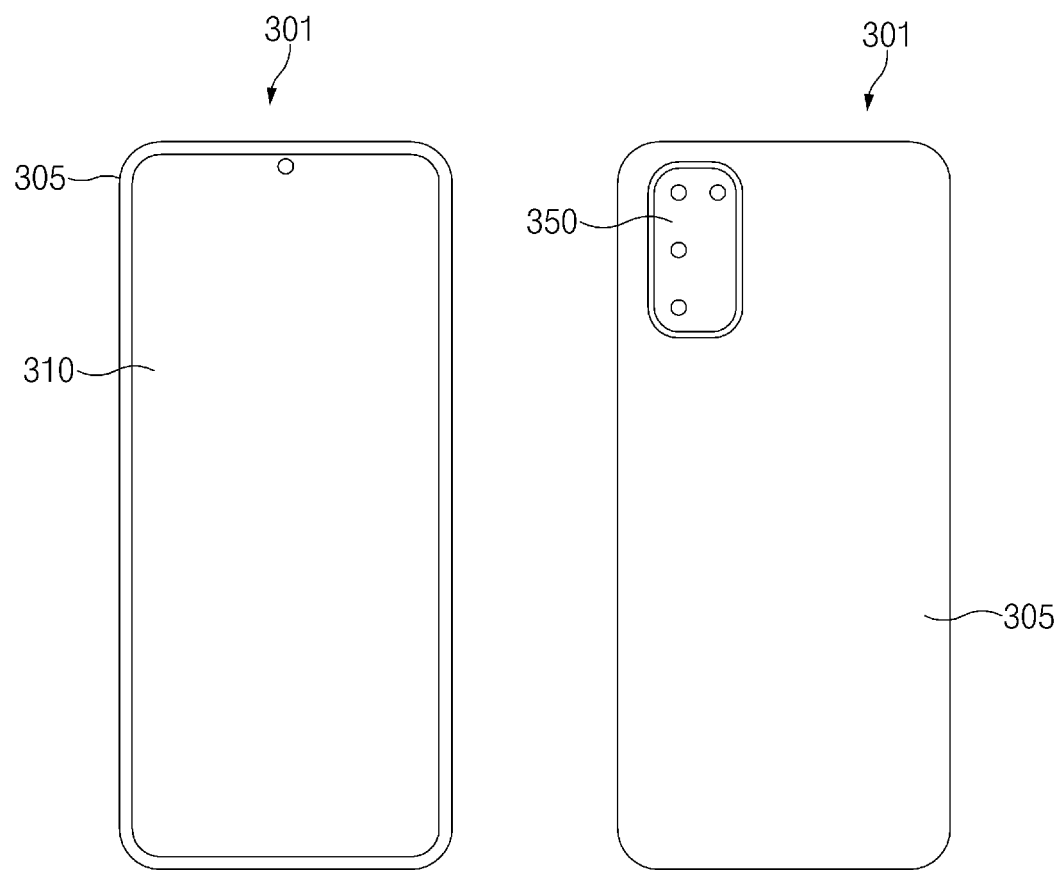
FIG. 3 illustrates an electronic device according to various embodiments.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera. FIG. 3 illustrates an electronic device according to various embodiments.

Referring to FIG. 3, an electronic device 301 may include a housing 305, a display 310, and a camera module 350. The electronic device 301 may further include components such as a button, a sensor, and a microphone.

According to an embodiment, the housing (or a body part) 305 may mount the display 310, the camera module 350, and surrounding buttons, and may include components such as a processor (e.g., the processor 120 of FIG. 1) for driving the electronic device 301, a memory (e.g., the memory 130 of FIG. 1), a sensor module (e.g., the sensor module 176 of FIG. 1), a printed circuit board (e.g., a printed circuit board (PCB), a printed board assembly (PBA), a flexible PCB (FPCB), or a rigid-flexible PCB (RFPCB)), and a battery (e.g., the battery 189 of FIG. 1) therein. In FIG. 3, a case in which the camera module 350 is mounted on the rear surface (the surface opposite to the surface on which the display 310 is disposed) of the housing 305 is illustrated as an example, but the disclosure is not limited thereto. For example, the camera module 350 may be mounted on the front surface (the surface on which the display 310 is disposed) of the housing 305.

According to an embodiment, the display 310 may output various contents provided to the user, and may receive the user's input through a touch input. The display 310 may output a preview image based on image data collected through the camera module 350. While verifying the preview image output through the display 310 in real time, the user may photograph a scene and thus obtain a photo or a video.

According to an embodiment, at least a part of the camera module 350 may be exposed to the outside of the housing 305. For example, a flash or a sensor unit of the camera module 350 may be exposed to the outside of the housing 305. In FIG. 3, a case in which the camera module 350 is a rear camera is illustrated as an example, but the disclosure is not limited thereto. For example, the camera module 350 may be a front camera disposed in the same direction as the display 310. In an embodiment, the camera module 350 may be disposed on the rear surface of one region of the display 310 to face the one region. For example, the camera module 350 may not be visually exposed to the one region, and may include an under display camera (UDC) that is hidden.

According to an embodiment, the camera module 350 may include a shake preventing device. The shake preventing device may move a lens or an image sensor to reflect and compensate for shake at the time of photographing. Additional information related to the shake preventing device may be provided through FIGS. 4 to 10.

Figure 4:
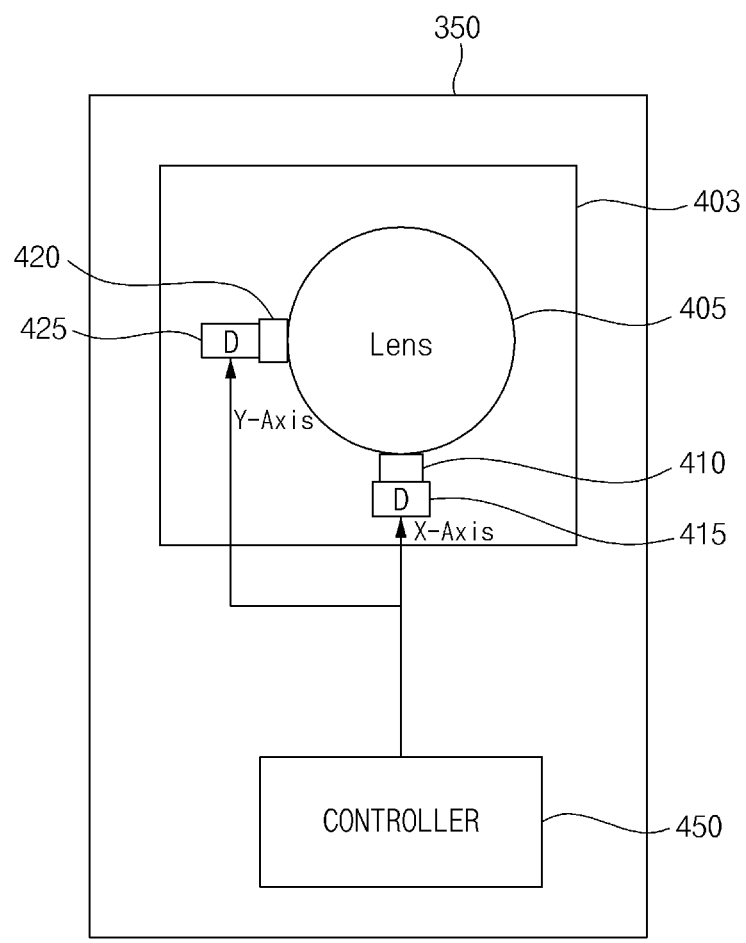
FIG. 4 is a block diagram of a camera module according to various embodiments.

FIG. 4 is a block diagram of the camera module 350 according to various embodiments.

Referring to FIG. 4, the camera module 350 (e.g., the camera module 180 of FIGS. 1 and 2) may include a lens unit 405, a shake stabilization device 403, and a controller 450. The shake stabilization device (e.g., the optical image stabilization (OIS) device) 403 may include a first direction driver 410, a first driver circuit 415, a second direction driver 420, and a second driver circuit 425. FIG. 4 illustrates a configuration related to the shake stabilization device 403 mainly, but is not limited thereto.

According to an embodiment, the lens unit 405 (e.g., the lens assembly 210 of FIG. 2) may collect light reflected from the subject, and may transmit the light to an image sensor (e.g., the image sensor 230 of FIG. 2). The lens unit 405 may move in response to the movement of the first direction driver 410 or the second direction driver 420, and accordingly, shaking that may occur during photographing may be compensated.

According to an embodiment, the first direction driver 410 may generate a movement in a first axis of the lens unit 405. For example, the first direction driver 410 may generate a movement in the X-axis direction with respect to the lens unit 405.

According to an embodiment, the first driver circuit 415 may control the first direction driver 410. The first driver circuit 415 may operate the first direction driver 410 based on a control signal received from the controller 450. The first driver circuit 415 may have unique device identification information (hereinafter, first identification information). According to an embodiment, the first driver circuit 415 may be a chip in which a first Hall sensor for detecting a movement in the first direction with respect to the lens unit 405 is embedded.

According to an embodiment, the second direction driver 420 may generate a movement in a second axis of the lens unit 405. For example, the second direction driver 420 may generate a movement in the Y-axis direction with respect to the lens unit 405.

According to an embodiment, the second driver circuit 425 may control the second direction driver 420. The second driver circuit 425 may operate the second direction driver 420 based on the control signal received from the controller 450. The second driver circuit 425 may have unique device identification information (hereinafter, second identification information). According to an embodiment, the second driver circuit 425 may be a chip in which a second Hall sensor for detecting a movement in the second direction with respect to the lens unit 405 is embedded.

According to an embodiment, the controller 450 may transmit the control signal for performing shake compensation to the first driver circuit 415 or the second driver circuit 425. For example, the control signal may be a signal conforming to at least one of an inter-integrated circuit (I2C) protocol, an improved inter-integrated circuit (I3C) protocol, or a serial peripheral interface (SPI) protocol. For example, the controller 450 may operate as a primary, and the first driver circuit 415 or the second driver circuit 425 may respectively operate as a secondary.

According to various embodiments, the controller 450 may be a part of the image signal processor 260 of FIG. 2 or a part of the processor 120 of FIG. 1.

According to an embodiment, the control signal may include target driver information (first information) and target position information (second information). The target driver information may include identification information of the first driver circuit 415 or the second driver circuit 425, which is the target of the control signal. The target position information may include a change amount of the first direction driver 410 or the second direction driver 420.

According to various embodiments, the first driver circuit 415 may move the first direction driver 410 by comparing its own identification information with the target driver information of the control signal. The second driver circuit 425 may move the second direction driver 420 by comparing its own identification information with the target driver information of the control signal.

According to various embodiments, the first driver circuit 415 or the second driver circuit 425 may correct the crosstalk occurring according to the movement of the other axis by using the target position information of the other axis (refer to FIGS. 5 to 10).

Figure 5:
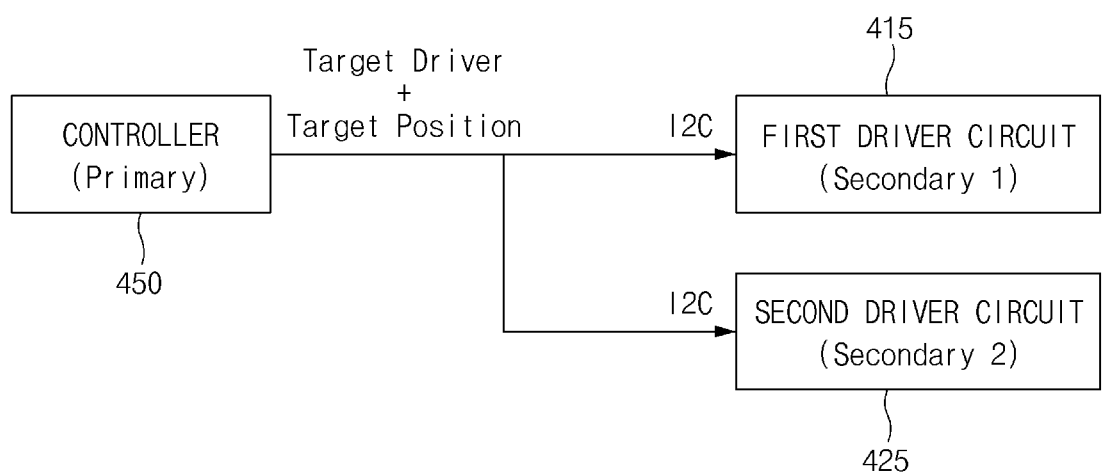
FIG. 5 illustrates a control of the first driver circuit and the second driver circuit by a controller according to various embodiments.

FIG. 5 illustrates a control of the first driver circuit and the second driver circuit by a controller according to various embodiments. FIG. 5 is illustrative and not limited thereto.

Referring to FIG. 5, the controller 450 may transmit the control signal to the first driver circuit 415 or the second driver circuit 425. The first driver circuit 415 and the second driver circuit 425 may respectively receive the control signal.

According to various embodiments, the control signal may be a signal conforming to an inter-integrated circuit (I2C) protocol. The controller 450 may operate as a primary of inter-integrated circuit (I2C) communication, and the first driver circuit 415 or the second driver circuit 425 may respectively operate as a secondary of inter-integrated circuit (I2C) communication.

According to various embodiments, the control signal may include the target driver information and the target position information. The target driver information may include identification information of the first driver circuit 415 or the second driver circuit 425 that is the target of the control signal. The target position information may include a change amount of the first direction driver 410 or the second direction driver 420.

According to various embodiments, when receiving the first identification information through the control signal, the first driver circuit 415 may control the first direction driver 410 depending on the target position information. For example, the first driver circuit 415 may move the first direction driver 410 based on receiving the first identification information. The first identification information may be device information unique to the first driver circuit 415.

According to various embodiments, when receiving the second identification information through the control signal, the first driver circuit 415 may determine a first correction amount corresponding to the target position information of the second direction driver 420. For example, the first driver circuit 415 may determine a first correction amount based on receiving the second identification information. The first correction amount may be reflected to the movement of the first direction driver 410 so as to reduce the influence of crosstalk (X-talk) generated according to the movement of the second direction driver 420.

According to various embodiments, when receiving the second identification information through the control signal, the second driver circuit 425 may control the second direction driver 420 depending on the target position information. For example, the second driver circuit 425 may control the second direction driver 420 based on receiving the second identification information. The second identification information may be device information unique to the second driver circuit 425.

According to various embodiments, when receiving the first identification information through the control signal, the second driver circuit 425 may determine a second correction amount corresponding to the target position information of the first direction driver 410. For example, the second driver circuit 425 may determine a second correction amount based on receiving the first identification information. The second correction amount may be reflected to the movement of the second direction driver 420 so as to reduce the influence of crosstalk (X-talk) generated according to the movement of the first direction driver 410.

Figure 6:
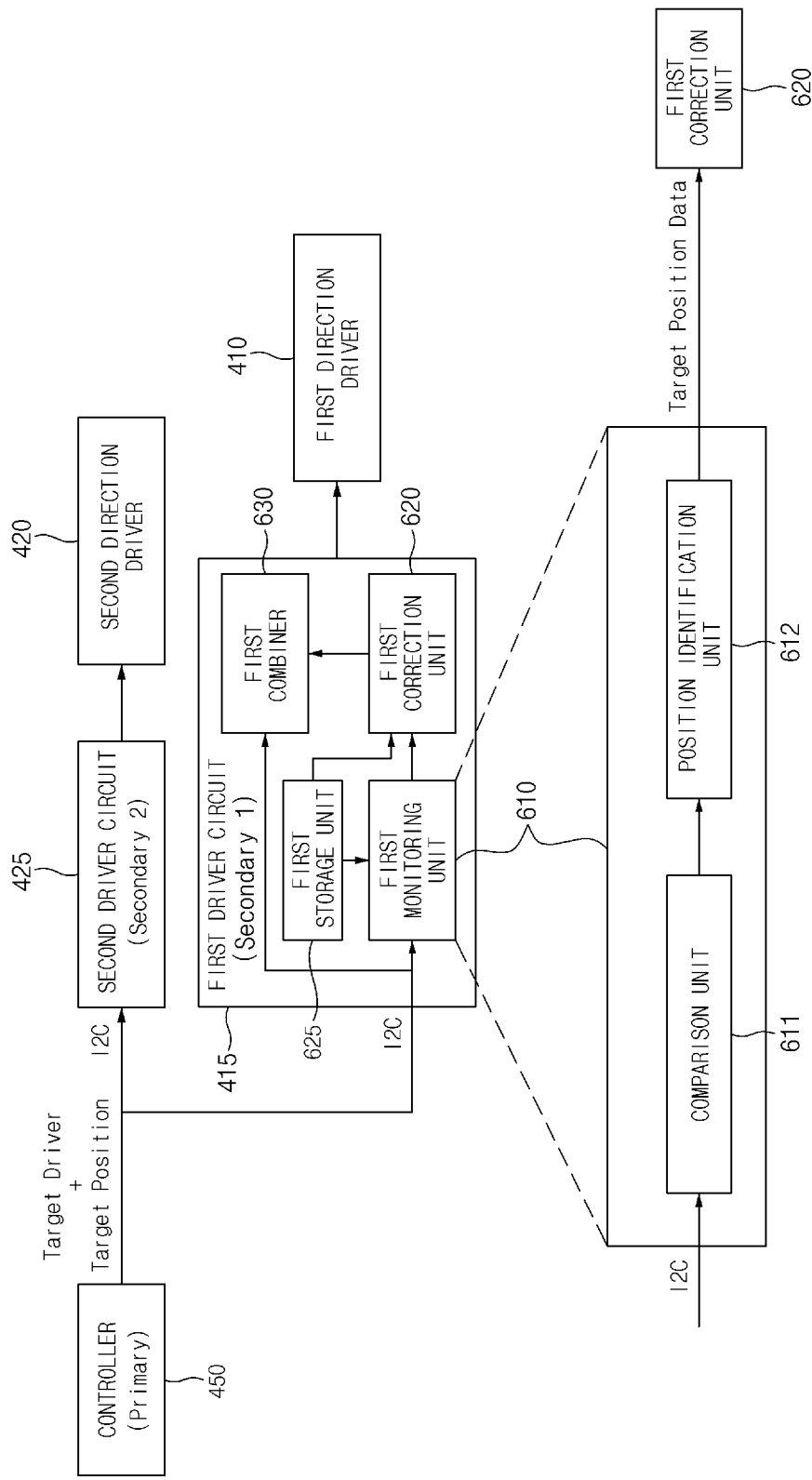
FIG. 6 illustrates a configuration diagram of a first driver circuit according to various embodiments.

FIG. 6 illustrates a configuration diagram of a first driver circuit according to various embodiments. FIG. 6 is illustrative and not limited thereto.

Referring to FIG. 6, the first driver circuit 415 may include a first monitoring unit 610, a first correction unit 620, a first storage unit 625, and a first combiner 630.

According to an embodiment, the first monitoring unit 610 may monitor the amount of change of the second direction driver 420. The first monitoring unit 610 may include a comparison unit 611 and a position identification unit 612.

According to an embodiment, the comparison unit 611 may compare the target driver information of the control signal with the second identification information stored in advance in the first storage unit 625. The second identification information may be stored in advance in the first storage unit 625 of the first driver circuit 415 for monitoring. When the target driver information matches the second identification information, the comparison unit 611 may transmit the control signal to the position identification unit 612.

According to an embodiment, the position identification unit 612 may determine whether the control signal includes the target position information. For example, when a register address of the control signal is a specified value, the position identification unit 612 may obtain the target position information. The target position information may indicate a position to which the second direction driver 420 will be moved. The position identification unit 612 may transmit the obtained target position information (hereinafter, target position information on the second axis) to the first correction unit 620.

According to an embodiment, the first correction unit 620 may determine a first correction amount for compensating for crosstalk of the first axis based on the target position information on the second axis.

According to an embodiment, when the storage capacity of the first storage unit 625 is relatively large, the first storage unit 625 may store correction data corresponding to various amounts of change in the target position information on the second axis as a lookup table. The first correction unit 620 may determine the first correction amount by referring to the lookup table.

According to another embodiment, when the storage capacity of the first storage unit 625 is relatively small, correction coefficients according to the position are obtained by measuring the amount of change of the first axis generated by the second axis in a process, and then they may be stored as a lookup table in the first storage unit 625. The first correction unit 620 may determine the first correction amount through a specified operation (e.g., the N-th order equation) with reference to a lookup table associated with the correction coefficients (e.g., the N-th order equation coefficients).

According to an embodiment, the first combiner 630 may determine whether the target driver information of the control signal matches the first identification information. In this case, the first combiner 630 may determine whether the control signal includes the target position information. For example, when the register address of the control signal is a specified value, the first combiner 630 may obtain the target position information. The target position information (hereinafter, target position information on the first axis) may indicate a position to which the first direction driver 410 will be moved.

According to an embodiment, the first combiner 630 may receive the first correction amount from the first correction unit 620. The first combiner 630 may move the first direction driver 410 based on the target position information on the first axis and the first correction amount.

According to various embodiments, the second driver circuit 425 may include a second monitoring unit (not illustrated), a second correction unit (not illustrated), a second storage unit (not illustrated), and a second combiner (not illustrated). Operations of the second monitoring unit (not illustrated), the second correction unit (not illustrated), the second storage unit (not illustrated), and the second combiner (not illustrated) are the same as or similar to those of the corresponding configuration of FIG. 6.

Figure 7:
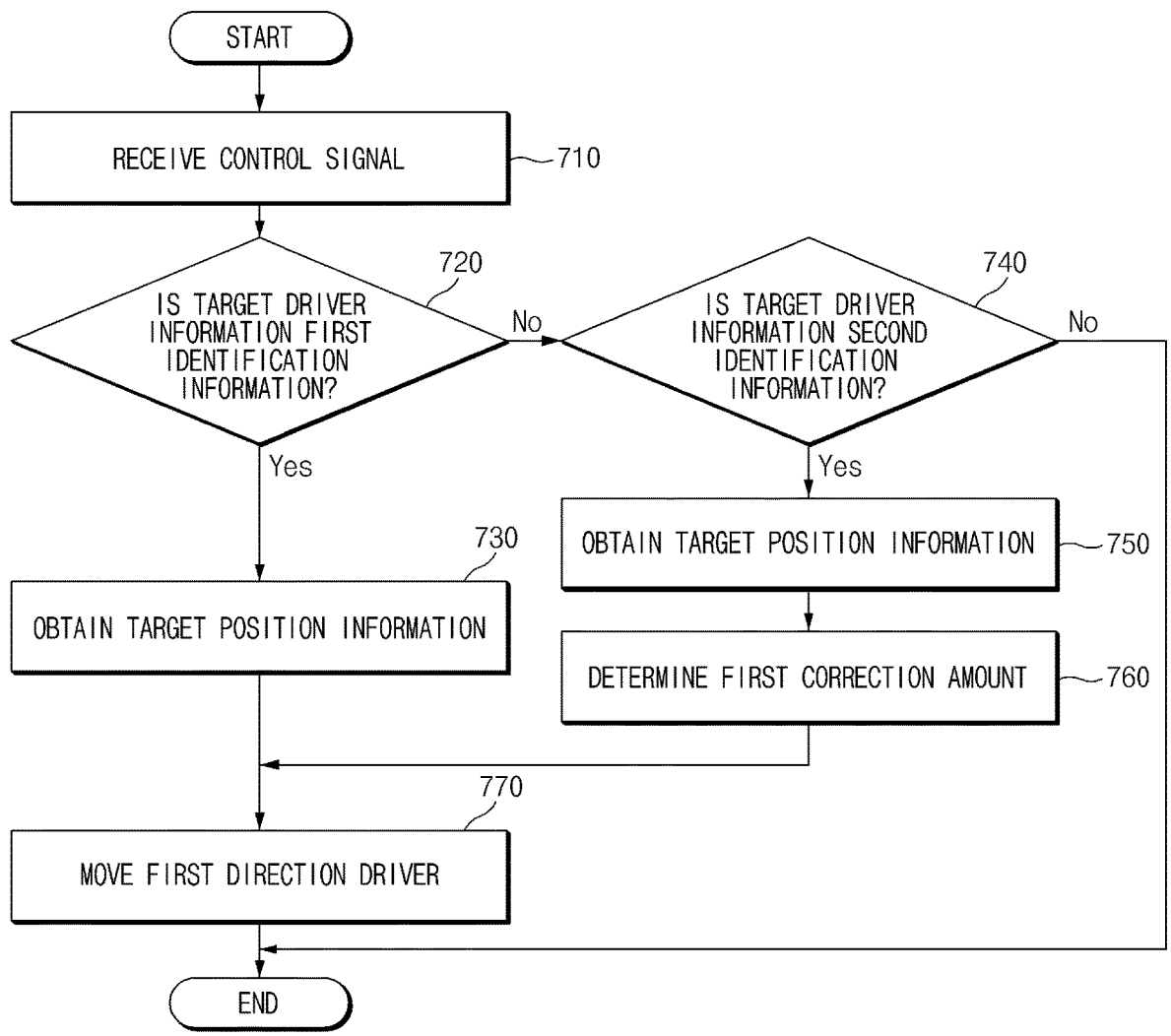
FIG. 7 is a flowchart illustrating a shake correction method of a first driver circuit according to various embodiments.

FIG. 7 is a flowchart illustrating a shake correction method (e.g., a crosstalk correction method) of the first driver circuit 415 according to various embodiments.

Referring to FIG. 7, in operation 710, the first driver circuit 415 may receive a control signal from a processor (e.g., the processor 120 of FIG. 1) or an image signal processor (e.g., the image signal processor 260 of FIG. 2). For example, the control signal may be a signal conforming to an inter-integrated circuit (I2C) protocol.

According to an embodiment, the control signal may include the target driver information and the target position information. The target driver information may include identification information of the first driver circuit 415 or the second driver circuit 425 that is the target of the control signal. The target position information may include a change amount of the first direction driver 410 or the second direction driver 420.

In operation 720, the first driver circuit 415 may determine whether the target driver information of the control signal matches the first identification information unique to the first driver circuit 415.

When the target driver information of the control signal matches the first identification information unique to the first driver circuit 415, in operation 730, the first driver circuit 415 may obtain the target position information (the target position information on the first axis) of the control signal.

According to various embodiments, when the register address of the control signal is a specified value, the first driver circuit 415 may acquire the target position information. When the register address is not the specified value, the first driver circuit 415 may perform a function matching the register address.

When the target driver information of the control signal is different from the first identification information, in operation 740, the first driver circuit 415 may determine whether the target driver information of the control signal matches the second identification information. The second identification information may be unique device identification information of the second driver circuit 425 that is a target to be monitored.

According to various embodiments, when the target driver information of the control signal is different from the second identification information (740-No), the first driver circuit 415 may maintain a state of the first direction driver 410.

When the target driver information of the control signal matches the second identification information, in operation 750, the first driver circuit 415 may acquire the target position information (the target position information on the second axis) of the control signal. The target position information on the second axis may indicate a position to which the second direction driver 420 will be moved.

In operation 760, the first driver circuit 415 may determine the first correction amount based on the target position information on the second axis. For example, the first driver circuit 415 may measure the amount of change in the first axis generated by the second axis in the process to obtain the correction coefficients according to the position, and may store them as a lookup table in the first storage unit 625. The first driver circuit 415 may determine the first correction amount through a specified operation (e.g., the N-th order equation) with reference to a lookup table associated with the correction coefficients (e.g., the N-th order equation coefficients).

According to various embodiments, the first driver circuit 415 may determine a correction coefficient corresponding to the target position information on the second axis by referring to the lookup table for the correction coefficients (e.g., the N-th order equation coefficients). The first driver circuit 415 may transmit the determined correction coefficient to the processor 120 or the image signal processor 260. The processor 120 or the image signal processor 260 may calculate the first correction amount using the received correction coefficient. The processor 120 or the image signal processor 260 may transmit the calculated first correction amount to the first driver circuit 415 or reflect it to the control signal.

In operation 770, the first driver circuit 415 may move the first direction driver 410 based on the target position information (information obtained in operation 730) on the first axis and the first correction amount (amount obtained in operation 760).

Figure 8A:
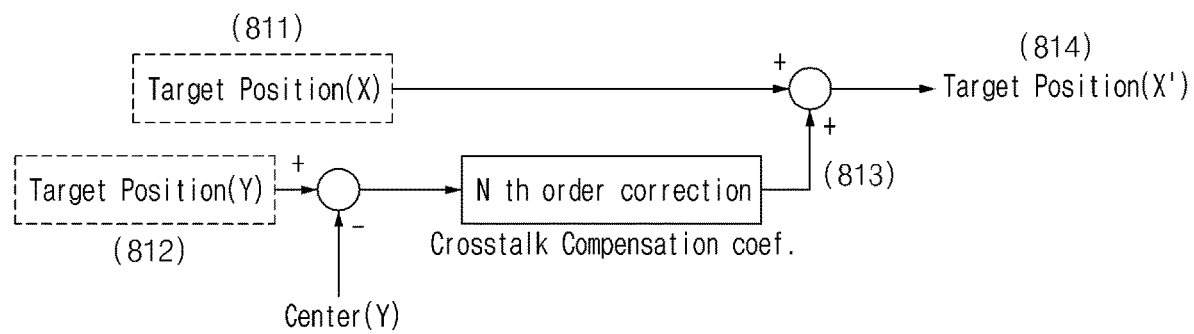
FIG. 8A is a diagram illustrating an example in which crosstalk due to a movement amount of a Y-axis is reflected in a movement amount of an X-axis, according to various embodiments.

FIG. 8A is diagram illustrating an example in which crosstalk due to a movement amount of a Y-axis is reflected in a movement amount of an X-axis, according to various embodiments.

Referring to FIG. 8A, when the target driver information of the control signal matches the first identification information unique to the first driver circuit 415, the first driver circuit 415 may obtain target position information 811 on the X-axis from the control signal.

According to various embodiments, when the target driver information of the control signal matches the second identification information, the first driver circuit 415 may obtain target position information 812 on the Y-axis from the control signal. The target position information 812 on the Y-axis may indicate a position to which the second direction driver 420 will be moved. According to various embodiments, the first driver circuit 415 may remove an offset of the Y-axis by subtracting the center value (Center(Y)) of the Y-axis from the target position information 812 on the Y-axis, and may calculate an actual change amount of the Y-axis.

According to various embodiments, the first driver circuit 415 may determine first correction amount 813 based on the target position information 812 on the Y-axis. For example, the first driver circuit 415 may subtract the center value (Center(Y)) of the Y-axis from the target position information 812 on the Y-axis, and may determine the first correction amount 813 through the specified operation (e.g., the N-th order equation) by using the correction coefficients (e.g., N-th order equation coefficients) calculated through the lookup table.

According to various embodiments, the first driver circuit 415 may combine the target position information 811 on the X-axis and the first correction amount 813 to generate an updated target position information 814 (X') on the X-axis. The first driver circuit 415 may move the first direction driver 410 by using the updated target position information 814 (X') on the X-axis.

Figure 8B:
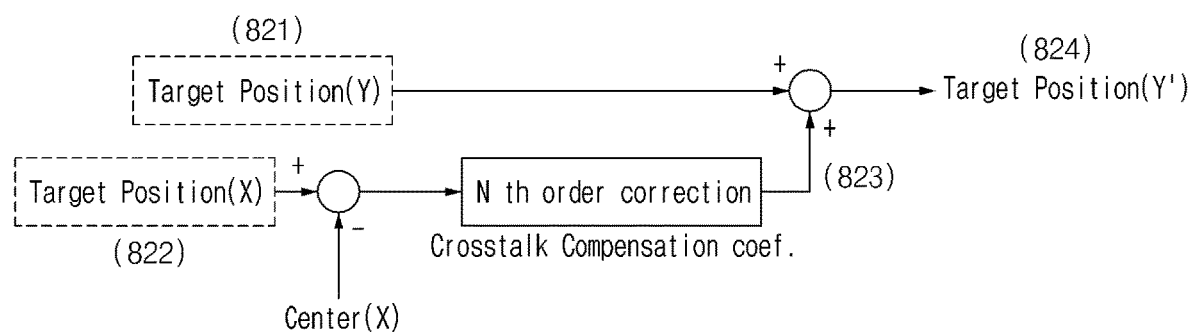
FIG. 8B is a diagram illustrating an example in which crosstalk due to a movement amount of an X-axis is reflected in a movement amount of a Y-axis, according to various embodiments.

FIG. 8B is a diagram illustrating an example in which crosstalk due to a movement amount of an X-axis is reflected in a movement amount of a Y-axis, according to various embodiments.

Referring to FIG. 8B, when the target driver information of the control signal matches the second identification information unique to the second driver circuit 425, the second driver circuit 425 may obtain target position information 821 on the Y-axis from the control signal.

According to various embodiments, when the target driver information of the control signal matches the first identification information, the second driver circuit 425 may obtain target position information 822 on the X-axis from the control signal. The target position information 822 on the X-axis may indicate a position to which the first direction driver 410 will be moved. According to various embodiments, the second driver circuit 425 may remove an offset of the X-axis by subtracting the center value (Center(X)) of the X-axis from the target position information 822 on the X-axis, and may calculate an actual change amount of the X-axis.

According to various embodiments, the second driver circuit 425 may determine second correction amount 823 based on the target position information 822 on the X-axis. For example, the second driver circuit 425 may subtract the center value (Center(X)) of the X-axis from the target position information 822 on the X-axis, and may determine the second correction amount 823 through the specified operation (e.g., the N-th order equation) by using the correction coefficients (e.g., N-th order equation coefficients) calculated through the lookup table.

According to various embodiments, the second driver circuit 425 may combine the target position information 821 on the Y-axis and the second correction amount 823 to generate an updated target position information 824 (Y') on the Y-axis. The second driver circuit 425 may move the second direction driver 420 by using the updated target position information 824 (Y') on the Y-axis.

Figure 9:
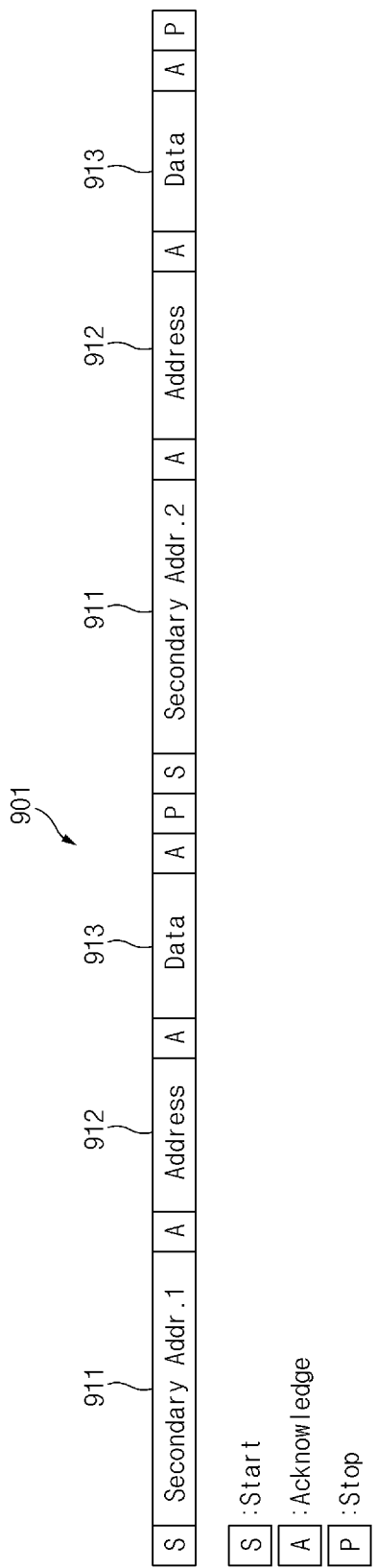
FIG. 9 illustrates a data format of a control signal according to various embodiments.

FIG. 9 illustrates a data format of a control signal according to various embodiments.

Referring to FIG. 9, the controller 450 may transmit a control signal 901 to the first driver circuit 415 and/or the second driver circuit 425. One signal unit of the control signal 901 may include target driver information 911, a register address 912, and data 913 between a start bit S and an end bit P. An Ack bit 'A') may be included after end of each of the target driver information 911, the register address 912, and the data 913.

According to various embodiments, the target driver information 911 may include first identification information or second identification information. The register address 912 may be mapped to various operations performed by the first driver circuit 415 and the second driver circuit 425. When the register address 912 is a specified value, the data 913 may be the target position information.

According to various embodiments, when the target driver information 911 matches the first identification information and the register address 912 is the specified value, the data 913 may be the target position information on the first axis. The first driver circuit 415 may move the first direction driver 410 by reflecting the data 913 (e.g., operations 720, 730 and 770 of FIG. 7). The second driver circuit 425 may determine the second correction amount based on the data 913. The second driver circuit 425 may reduce crosstalk caused by the movement of the first direction driver 410 by using the second correction amount.

According to various embodiments, when the target driver information 911 matches the second identification information and the register address 912 is the specified value, the data 913 may be the target position information on the second axis. The first driver circuit 415 may determine the first correction amount based on the data 913. The first driver circuit 415 may reduce crosstalk caused by the movement of the second direction driver 420 by using the first correction amount. (e.g., operations 740, 750, 760, and 770 of FIG. 7). The second driver circuit 425 may move the second direction driver 420 by reflecting the data 913.

FIG. 9 is illustrative and not limited thereto. For example, the control signal 901 may include a plurality of other sections in which the target driver information 911 matches the second identification information after a plurality of sections in which the target driver information 911 matches the first identification information.

Figure 10:
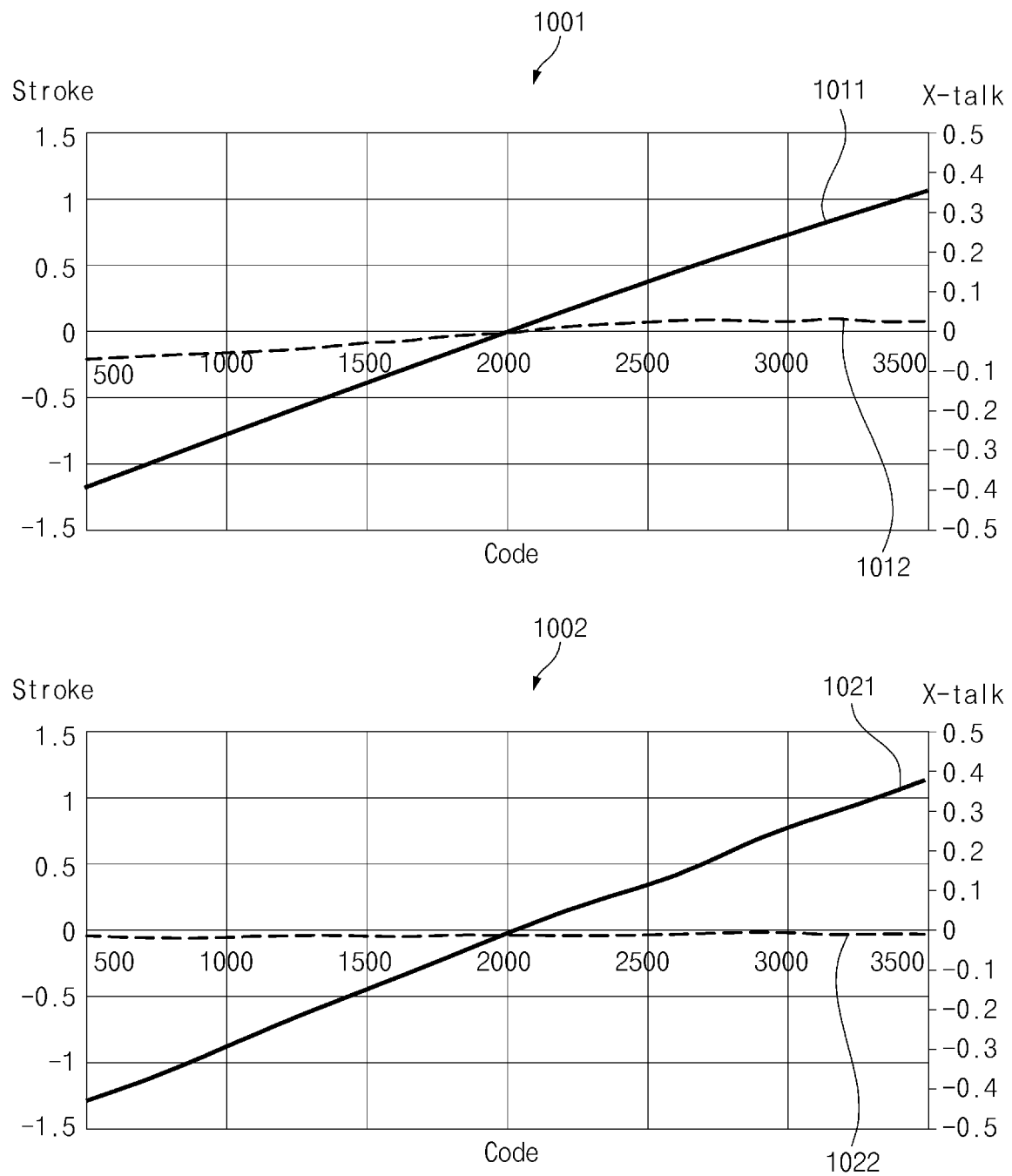
FIG. 10 is a graph illustrating a correction effect according to various embodiments.

FIG. 10 is a graph illustrating a correction effect according to various embodiments.

Referring to FIG. 10, a first graph 1001 and a second graph 1002 are movement amounts 1011 and 1021 (Stroke) of the first axis and changes in crosstalks 1012 and 1022 (X-talk) of the second axis according to a code value (e.g., the data 913 of FIG. 9) of the control signal.

The first graph 1001 may represent a state in which the first driver circuit 415 or the second driver circuit 425 individually operates in response the control signal, and the movement amount of the other axis is not monitored. In this case, as the movement amount 1011 of the first axis increases, the crosstalk 1012 of the second axis may increase.

The second graph 1002 may represent a state in which the first driver circuit 415 or the second driver circuit 425 monitors the movement amount of the other axis. In this case, as the movement amount 1021 of the first axis increases, the crosstalk 1022 of the second axis may be absent or may be maintained at a low value.

According to various embodiments, an electronic device (e.g., the electronic device 101 of FIG. 1, or the electronic device 301 of FIG. 3) includes a camera module (e.g., the camera module 180 of FIG. 1 or 2, or the camera module 350 of FIG. 3 or 4) including an optical image stabilization device, a memory (e.g., the memory 130 of FIG. 1), and a processor (e.g., the processor 120 of FIG. 1), and the optical image stabilization device includes a first direction driver (e.g., the first direction driver 410 of FIG. 4), a first driver circuit (e.g., the first driver circuit 415 of FIG. 4) that controls the first direction driver (e.g., the first direction driver 410 of FIG. 4), a second direction driver (e.g., the second direction driver 420 of FIG. 4), a second driver circuit (e.g., the second driver circuit 425 of FIG. 4) that controls the second direction driver (e.g., the second direction driver 420 of FIG. 4), and the first driver circuit (e.g., the first driver circuit 415 of FIG. 4) monitors a movement amount of the second direction driver (e.g., the second direction driver 420 of FIG. 4) in a control signal transmitted from the processor (e.g., the processor 120 of FIG. 1), determines a first correction amount corresponding to the movement amount, and moves the first direction driver (e.g., the first direction driver 410 of FIG. 4) based on the first correction amount.

According to various embodiments, the processor (e.g., the processor 120 of FIG. 1) may transmit the control signal to the first driver circuit (e.g., the first driver circuit 415 of FIG. 4) or the second driver circuit (e.g., the second driver circuit 425 of FIG. 4) using an inter-integrated circuit (I2C) protocol.

According to various embodiments, the control signal may include first information associated with a target driver and second information associated with a target position.

According to various embodiments, the first driver circuit (e.g., the first driver circuit 415 of FIG. 4) may move the first direction driver (e.g., the first direction driver 410 of FIG. 4) by combining the second information and the first correction amount when the first information matches the first identification information unique to the first driver circuit (e.g., the first driver circuit 415 of FIG. 4).

According to various embodiments, the first driver circuit (e.g., the first driver circuit 415 of FIG. 4) may obtain the second information when a register address of the control signal is a specified value.

According to various embodiments, the first driver circuit (e.g., the first driver circuit 415 of FIG. 4) may perform a function corresponding to the register address when the register address of the control signal is not the specified value.

According to various embodiments, the first driver circuit (e.g., the first driver circuit 415 of FIG. 4) may obtain the second information when the first information matches the second identification information unique to the second driver circuit (e.g., the second driver circuit 425 of FIG. 4), and may determine the first correction amount based on the obtained second information.

According to various embodiments, the first driver circuit (e.g., the first driver circuit 415 of FIG. 4) may store the second identification information in an internal memory.

According to various embodiments, the first driver circuit (e.g., the first driver circuit 415 of FIG. 4) may store a lookup table associated with the amount of change of the first correction amount corresponding to the amount of change of the second information in the internal memory.

According to various embodiments, the first driver circuit (e.g., the first driver circuit 415 of FIG. 4) may store a lookup table associated with a correction coefficient for calculating the first correction amount in the internal memory.

According to various embodiments, the first driver circuit (e.g., the first driver circuit 415 of FIG. 4) may determine the correction coefficient corresponding to the second information by using the lookup table.

According to various embodiments, the first driver circuit (e.g., the first driver circuit 415 of FIG. 4) may calculate the first correction amount by using the determined correction coefficient.

According to various embodiments, the first driver circuit (e.g., the first driver circuit 415 of FIG. 4) may transmit the determined correction coefficient to the processor (e.g., the processor 120 of FIG. 1) or the image signal processor of the camera module (e.g., the camera module 180 of FIG. 1 or 2, or the camera module 350 of FIG. 3 or 4).

According to various embodiments, the processor (e.g., the processor 120 of FIG. 1) may calculate the first correction amount by using the determined correction coefficient, and may reflect it to the control signal.

According to various embodiments, the first driver circuit (e.g., the first driver circuit 415 of FIG. 4) may obtain the second information when a register address of the control signal is a specified value.

According to various embodiments, the first driver circuit (e.g., the first driver circuit 415 of FIG. 4) may maintain the first correction amount when a register address of the control signal is not the specified value.

According to various embodiments, the second driver circuit (e.g., the second driver circuit 425 of FIG. 4) may monitor a movement amount of the first direction driver (e.g., the first direction driver 410 of FIG. 4) from the control signal to determine a second correction amount corresponding to the movement amount, and may control the second direction driver (e.g., the second direction driver 420 of FIG. 4) based on the second correction amount.

According to various embodiments, the control signal may include first information on a target driver and second information on a target position, and the second driver circuit (e.g., the second driver circuit 425 of FIG. 4) may control the second direction driver (e.g., the second direction driver 420 of FIG. 4) by combining the second information and the second correction amount when the first information matches the second identification information unique to the second driver circuit (e.g., the second driver circuit 425 of FIG. 4).

According to various embodiments, the second driver circuit (e.g., the second driver circuit 425 of FIG. 4) may obtain the second information when the first information matches the first identification information unique to the first driver circuit (e.g., the first driver circuit 415 of FIG. 4), and may determine the second correction amount based on the obtained second information.

According to various embodiments, the first driver circuit (e.g., the first driver circuit 415 of FIG. 4) or the second driver circuit (e.g., the second driver circuit 425 of FIG. 4) may embed a Hall sensor.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a camera module including an optical image stabilization device;
a memory; and
a processor,
wherein the optical image stabilization device comprises:
a first direction driver,
a first driver circuit configured to control the first direction driver,
a second direction driver, and
a second driver circuit configured to control the second direction driver, and
wherein the first driver circuit is configured to:
monitor a movement amount of the second direction driver from a control signal transmitted from the processor, wherein the control signal includes first information associated with a target driver and second information associated with a target position,
determine a first correction amount corresponding to the movement amount, and
control the first direction driver based on the first correction amount.

2. The electronic device of claim 1, wherein the processor is configured to transmit the control signal to the first driver circuit or the second driver circuit using an I2C (Inter-Integrated Circuit) protocol.

3. The electronic device of claim 1, wherein the first driver circuit is further configured to control the first direction driver by combining the second information and the first correction amount based on the first information matching first identification information unique to the first driver circuit.

4. The electronic device of claim 3, wherein the first driver circuit is further configured to obtain the second information based on a register address of the control signal being a specified value.

5. The electronic device of claim 4, wherein the first driver circuit is further configured to perform a function corresponding to the register address based on the register address of the control signal not being the specified value.

6. The electronic device of claim 1, wherein the first driver circuit, based on the first information matching second identification information unique to the second driver circuit, is further configured to:
obtain the second information, and
determine the first correction amount based on the second information.

7. The electronic device of claim 6, wherein the first driver circuit is further configured to store the second information in an internal memory.

8. The electronic device of claim 7, wherein the first driver circuit is further configured to store a lookup table associated with a first amount of change of the first correction amount corresponding to a second amount of change of the second information in the internal memory.

9. The electronic device of claim 7, wherein the first driver circuit is further configured to store a lookup table associated with a correction coefficient for calculating the first correction amount in the internal memory.

10. The electronic device of claim 9, wherein the first driver circuit is further configured to determine the correction coefficient corresponding to the second information by using the lookup table.

11. The electronic device of claim 10, wherein the first driver circuit is further configured to calculate the first correction amount by using the correction coefficient.

12. The electronic device of claim 10, wherein the first driver circuit is further configured to transmit the correction coefficient to the processor or an image signal processor of the camera module.

13. The electronic device of claim 12, wherein the processor is further configured to:

calculate the first correction amount by using the correction coefficient, and reflect the first correction amount to the control signal.

14. The electronic device of claim 6, wherein the first driver circuit is further configured to obtain the second information based on a register address of the control signal being a specified value.

15. The electronic device of claim 14, wherein the first driver circuit is further configured to maintain the first correction amount based on the register address of the control signal not being the specified value.

16. The electronic device of claim 1, wherein the second driver circuit is configured to:

monitor a first movement amount of the first direction driver from the control signal, determine a second correction amount corresponding to the first movement amount, and control the second direction driver based on the second correction amount.

17. The electronic device of claim 16, wherein the second direction driver is further configured to control the second direction driver by combining the second information and the second correction amount based on the first information matching second identification information unique to the second driver circuit.

18. The electronic device of claim 17, wherein the second driver circuit, based on the first information matching first identification information unique to the first driver circuit, is further configured to:

obtain the second information, and determine the second correction amount based on the second information.

19. The electronic device of claim 1, wherein the first driver circuit or the second driver circuit comprises a hall sensor.

20. An electronic device comprising:

a camera module including an optical image stabilization device;

a memory; and a processor, wherein the optical image stabilization device comprises:

a first direction driver, a first driver circuit configured to control the first direction driver, a second direction driver, and a second driver circuit configured to control the second direction driver, and wherein the first driver circuit is configured to:

monitor a movement amount of the second direction driver from a control signal transmitted from the processor, determine a first correction amount corresponding to the movement amount, and control the first direction driver based on the first correction amount, wherein the first driver circuit is configured to determine the first correction amount by:

subtracting a center position of a second axis from a second target position information amount to obtain a difference amount; and applying a plurality of correction coefficients to the difference amount to obtain the first correction amount, wherein the plurality of correction coefficients are obtained from a lookup table.

* * * * *